R. O. BINGHAM.
WAFFLE IRON.
APPLICATION FILED JULY 10, 1909.
950,090.
Patented Feb. 22, 1910.
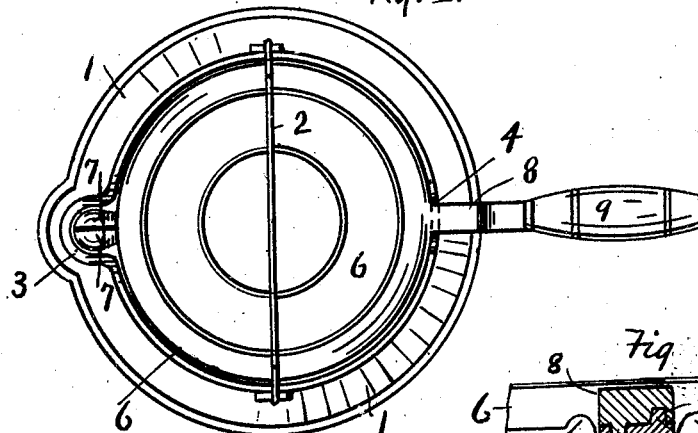
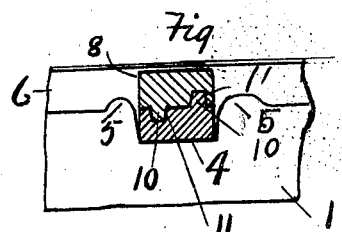
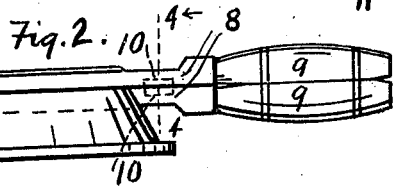
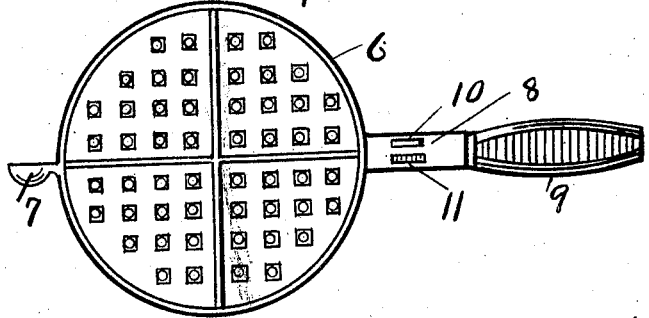
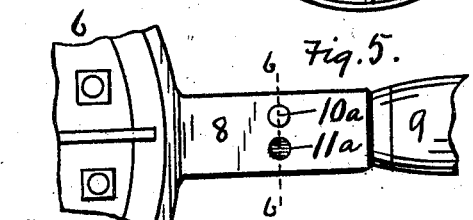
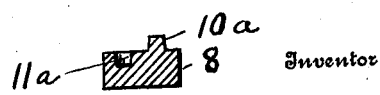
Witnesses
H. L. Gould
C. M. Catlin
Inventor
R. O. Bingham,
By Benj. R. Catlin,
Attorney

UNITED STATES PATENT OFFICE.

ROBERT O. BINGHAM, OF SIDNEY, OHIO, ASSIGNOR TO WAGNER MANUFACTURING CO., OF SIDNEY, OHIO, A CORPORATION OF OHIO.

WAFFLE-IRON.

950,090.

Specification of Letters Patent.   Patented Feb. 22, 1910.

Application filed July 10, 1909.   Serial No. 506,979.

*To all whom it may concern:*

Be it known that I, ROBERT O. BINGHAM, a resident of Sidney, in the county of Shelby and State of Ohio, have invented certain new and useful Improvements in Waffle-Irons; and I do hereby declare the following to be a full, clear, and exact description of the invention, such as will enable others skilled in the art to which it pertains to make and use the same.

This invention relates to waffle-irons, and the object of the invention is to simplify and improve such devices of the general character set forth in my Patents Nos. 479,731, of July 26, 1892, and 569,444, Oct. 13, 1896.

The invention consists in the construction hereinafter described and particularly pointed out.

In the accompanying drawing which illustrates the invention and forms part of the specification,—Figure 1 is a plan view of the device, the pans being closed; Fig. 2 is a side view of the same; Fig. 3 is a plan view of one pan detached; Fig. 4 is a partial enlarged section on line 4—4 of Fig. 2; Fig. 5 is a partial plan view, and Fig. 6 a section on line 6—6 of Fig. 5 showing a modification of the handle engaging devices.

In the drawing numeral 1 denotes a metal waffle-iron-supporting-ring, open at top and bottom, and adapted to be placed over a flame or heater, and having a bail 2; also a ball-socket 3 in one side of the ring. These parts as thus described are the same as in my patented construction. In the present ring, opposite socket 3, is a notch 4, the bottom of which is flat and horizontal, for a purpose hereinafter described. The sides of the notch may spread a little, and at the top may terminate in rounded ears 5.

The waffle iron comprises two pans 6 which are in all respects alike, that is, they are duplicates of each other, and not rights and lefts, as in my old form, and the description of one pan will apply to either. Each pan has a body of suitable form and surface, and has at one side a half-ball bearing extension 7, the flat side of which is at right angles to the plane of the body. Diametrically opposite said extension is a projecting handle comprising a shank 8 and a wood or other handle-part 9. On the front side of the handle shank is formed, preferably in the casting, an elongated lug or projection 10, and symmetrically beside the lug a socket 11, of proper size to receive a lug 10 of a duplicate handle when two pans are assembled for use. When two pans are placed face to face the lug and socket of one handle fit and engage with those of the other, and owing to the length of the projections and sockets the pans will be held parallel and in proper relation so that the two half-balls 7 together form a ball adapted to fit and turn in the socket 3. There is no connection between the halves of the ball, and the top pan can be lifted bodily from the lower one without raising the lower pan, and without first turning the pans to vertical position. The upper pan alone can be tilted upward by its handle; or both pans can be raised to such position by their handles and turned together. This is sometimes necessary when the device is used over a gasolene or similar burner, in order to give room for the pans to turn (as it would be free to do over a cover opening of a stove) when ring 1 is narrow, as shown. In practice rings designed specially for use with such burners may be made sufficiently high to permit the pans to turn when in horizontal position thereon.

The handle shank 8 is substantially rectangular in cross section, and about twice as wide as thick. The shanks rest in notch 4 as most clearly shown in Fig. 4. From the construction described it follows that when the pans are in use the user can reverse them by turning either to the right or to the left, without the necessity of looking or feeling to learn which way to turn, as required in my old device.

In the improved device there is no positive stop for the pans when turned 180 degrees. By omitting such stops, and depending on the angular form of the handle-shanks, and of the notch 4, the pans may be turned forward and backward alternately, or in the same direction repeatedly, without any attention or thought to the direction, which is a great advantage. The lower handle in the notch 4 holds the pans in position with sufficient force for all practical purposes, and allows the pans to be turned with sufficient ease in either direction.

The wood parts of the handles are so formed and mounted that when the pans are closed the handles bear against each other, so that they may be both grasped firmly by one hand without any tendency to separate the parts of the ball at the opposite edge of the pans. The wood handles are shown flattened on their proximate sides for this reason, and it is because of this construction that the half balls of the bearing need no positive connection except their location in the bearing socket.

While elongated projections and sockets are preferred, in some cases one or more pins 10ᵃ and sockets 11ᵃ may be used instead.

Having described the invention what I claim is,—

1. In a device of the character described, the combination with a support comprising a ring having a socket adapted to form a bearing, and having opposite the socket a notch having a flat substantially horizontal bottom, of waffle pans free to turn in either direction, each having a projecting half-bearing, which together form a bearing projection for said socket, said pans having handles with flat sides adapted to loosely fit said notch and the bearing side being substantially horizontal to rest on said flat bottom of said notch to temporarily hold the pans in set position but permitting turning in either direction while the handles are bearing on the bottom of the notch.

2. In a device of the character described, the combination with a support comprising a ring having a socket adapted to form a bearing, and having opposite the socket a notch, of duplicate waffle pans having handles to fit said notch, the handles each having both a projection and a socket adapted to coöperate with a duplicate socket and projection of the other handle whereby said handles are engaged to hold the pans in alinement, and all pans are interchangeable.

3. A waffle-iron comprising two duplicate pans each having a bearing projection, and each pan having a handle, the proximate sides of the handles each having both a projection and a socket corresponding to like parts of the other handle, whereby the handles are engaged to hold the pans in alinement and all pans are interchangeable.

4. The combination with a support having a bearing socket, of a waffle-iron comprising two duplicate pans each having a bearing projection, which together form a bearing adapted to fit the bearing socket, the two pans being adapted to turn entirely around in either direction in said support, and each pan having a handle opposite the bearing, each handle having both a projection and a socket adapted to coöperate with like parts on the other handle, the proximate sides of the handles resting together, as set forth.

In testimony whereof, I have signed this specification in the presence of two subscribing witnesses.

ROBERT O. BINGHAM.

Witnesses:
C. M. CATLIN,
H. C. FRANC.